United States Patent
Wang et al.

(10) Patent No.: US 12,228,131 B1
(45) Date of Patent: Feb. 18, 2025

(54) INTEGRATED ELECTRIC OIL PUMP

(71) Applicant: HANGZHOU QUADRANT TECHNOLOGY CO., LTD., Zhejiang (CN)

(72) Inventors: Liping Wang, Zhejiang (CN); Guojun Zhang, Zhejiang (CN); Ruinan Wang, Zhejiang (CN); Hezhao Hua, Zhejiang (CN); Yi Zhao, Zhejiang (CN)

(73) Assignee: HANGZHOU QUADRANT TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 18/638,892

(22) Filed: Apr. 18, 2024

(30) Foreign Application Priority Data

Aug. 17, 2023 (CN) .......................... 202311034365.1
Nov. 29, 2023 (CN) .......................... 202311608228.4

(51) Int. Cl.
*F04C 2/10* (2006.01)
*F04C 11/00* (2006.01)
*F04C 29/04* (2006.01)

(52) U.S. Cl.
CPC .............. *F04C 2/10* (2013.01); *F04C 11/008* (2013.01); *F04C 29/04* (2013.01);
(Continued)

(58) Field of Classification Search
CPC .......... F04C 2/10; F04C 11/008; F04C 29/04; F04C 2240/30; F04C 2240/40; F04C 2240/50
See application file for complete search history.

(56) References Cited

U.S. PATENT DOCUMENTS

| 7,614,227 | B2 | 11/2009 | Carlson et al. |
| 8,376,720 | B2 * | 2/2013 | Rosalik, Jr. ............. F04C 2/102 417/356 |

(Continued)

FOREIGN PATENT DOCUMENTS

| JP | 2009156081 A | 7/2009 |
| JP | 2009162146 A | 7/2009 |

(Continued)

OTHER PUBLICATIONS

Office Action received in corresponding Japanese Patent Application No. 2024-137467, dated Nov. 12, 2024, 10 pages.
(Continued)

*Primary Examiner* — Connor J Tremarche
(74) *Attorney, Agent, or Firm* — Cooper Legal Group, LLC

(57) ABSTRACT

An integrated electric oil pump includes a pump housing, in which a motor and a gerotor in the motor are arranged, a ball bearing is arranged between the motor and the gerotor, the motor includes a stator assembly and a motor rotor, the gerotor includes an inner gear, an outer gear and a pin, the hollow motor rotor is installed within the stator assembly, the outer gear is arranged in the motor rotor and is integrated with the motor rotor, a shaft sleeve is installed at a center of the motor rotor, the pin is arranged inside the shaft sleeve, the inner gear is arranged outside the shaft sleeve, the inner gear and the pin are respectively in press fit with the shaft sleeve, and the inner gear is engaged with the outer gear.

3 Claims, 2 Drawing Sheets

(52) U.S. Cl.
CPC ...... *F04C 2240/30* (2013.01); *F04C 2240/40* (2013.01); *F04C 2240/50* (2013.01)

(56) References Cited

U.S. PATENT DOCUMENTS

| | | |
|---|---|---|
| 2005/0186089 A1 | 8/2005 | Nakayoshi et al. |
| 2007/0231176 A1* | 10/2007 | Asai ........................ F04C 2/102 418/61.2 |
| 2009/0175751 A1* | 7/2009 | Nakayoshi .......... F04C 15/0042 310/58 |
| 2011/0129364 A1 | 6/2011 | Yamamori et al. |
| 2013/0052058 A1 | 2/2013 | Motohashi et al. |
| 2014/0154125 A1* | 6/2014 | Blechschmidt ..... F04C 15/0003 418/61.3 |

FOREIGN PATENT DOCUMENTS

| | | |
|---|---|---|
| JP | 2023502630 A | 1/2023 |
| KR | 20230024800 A | 2/2023 |

OTHER PUBLICATIONS

Non-Final Office Action received in corresponding U.S. Appl. No. 18/801,947, dated Oct. 7, 2024, 25 pages.

Non-Final Office Action received in corresponding U.S. Appl. No. 18/801,900, dated Dec. 20, 2024, 13 pages.

\* cited by examiner

INTEGRATED ELECTRIC OIL PUMP

CROSS-REFERENCE TO RELATED APPLICATION

This application claims the priority and benefit of Chinese patent application serial no. 202311034365.1, filed on Aug. 17, 2023, and Chinese patent application serial no. 202311608228.4, filed on Nov. 29, 2023. The entireties of Chinese patent application serial no. 202311034365.1 and Chinese patent application serial no. 202311608228.4 are hereby incorporated by reference herein and made a part of this specification.

TECHNICAL FIELD

The disclosure relates to the technical field of electric oil pumps for new energy vehicles, and more particularly, to a highly integrated electric oil pump.

BACKGROUND ART

With the rapid development of automobile electrification and new energy vehicles, integrated electric oil pumps are increasingly used due to their high efficiency, energy saving and flexible and diverse control. The integrated electric oil pump mainly includes three parts: a gerotor, a motor and a controller etc.

At present, most of the electric oil pumps have large size, occupy large volume, and require high assembling costs. Most of the bearings between the motor and the gerotor are mounted on a bearing bushing, which forms a higher profile of the electric oil pump. A pocket is defined between most of pump housings and gerotors, contributing to large frictions on gerotor pocket, and causing a lot of loss. To prevent the motor stator from overheating and causing damage, it is critically required to cool the motor stator with the oil circulation. However, currently most lubricating oil flows through a long path of the stator, affecting the cooling efficiency.

SUMMARY

The disclosure aims to propose a highly integrated electric oil pump with reasonable design, small size, excellent cooling effect and low manufacturing cost.

In view of the problems in the existing technology, this disclosure aims to provide a highly integrated electric oil pump which has small size, short time for cooling the stator, low friction at the pocket of the gerotor, and effectively improving the efficiency of the electric oil pump system.

The technical solution of the disclosure is as follows.

An integrated electric oil pump includes a housing, wherein a motor and a gerotor are installed in the housing, the stator assembly is equipped with a motor rotor on the inner side. The gerotor includes an inner gear, an outer gear and a pin, the motor rotor is internally provided with the outer gear, so that the outer gear is integrated with the motor rotor and pressed together. the outer gear is integrated with the motor rotor, contributing to the reduction of size and weight of the system. A bushing is installed at the center of the motor rotor, and a pin is provided on the inner side of the bushing. A ball bearing is installed between the motor and the gerotor, being flush with the gerotor surface. The inner gear is arranged outside the shaft bushing, the inner gear and the pin are respectively in press fit with the shaft bushing, and the inner gear is engaged with the outer gear.

In addition, the ball bearing is arranged between the motor rotor and the outer gear, and the ball bearing is mounted at the end of the gerotor. There is no pocket between the motor and the gerotor, which reduces the height of the electric oil pump and significantly reduces the weight and size of the gerotor, and cost reduction. Pocket elimination between the housing and gerotor contributes to the less friction loss, resulting in higher electric oil pump efficiency.

In addition, the ball bearing and the pump housing are processed with the same mechanical fixture, to ensure both have extremely precise coaxiality and concentricity, allowing for precise control of eccentricity.

In addition, the stator of the motor and a pump body of the gerotor have the same or very close thermal expansion coefficient, which significantly reduces the temperature influence on the end face clearance of the electric oil pump.

In addition, the pump housing is provided with an oil inlet and an oil outlet.

In addition, the motor rotor and the outer gear drive the inner gear to rotate around the shaft bushing, so as to pressurize a cooling oil to flow from the oil inlet, so that a first portion of the pressurized cooling oil flows to the stator assembly through the pin to cool the stator assembly, and flows back to a low-pressure area after heat-exchanging, and a second portion of the pressurized cooling oil is discharged directly from the oil outlet after passing through a high-pressure area.

In addition, a flow channel configured for the cooling oil to pass through is defined in the pin.

Compared to the existing technique, the advantageous effects of the disclosure are as follows:

1) Based on the technical solution of the disclosure, the outer gear is arranged inside the motor rotor, the outer gear is integrated with the motor rotor, which, on the one hand, reduces the size, the weight and material and production costs of the system significantly, and on the other hand, by which the friction in the pocket of the gerotor is effectively reduced, obviously improving the system efficiency.

2) The ball bearing of the disclosure is arranged between the motor rotor and the outer gear, the ball bearing supports the motor and the outer gear, the ball bearing is mounted at the end of the gerotor, so that there is no pocket between the motor and the gerotor, which reduces the height of the electric oil pump and significantly reduces the weight and size of the gerotor.

3) Compared with a traditional electric oil pump in which the motor rotor is pressed into the ball bearing bushing and then into the ball bearing and the pump gear, no ball bearing bushing is provided in the disclosure, which, on one hand, reduces the overall height of the electric oil pump, so that the flow path of the pressurized cooling oil flowing to the stator assembly is shortened, less cooling time and higher cooling efficiency are obtained, and on the other hand, avoids cumulative assembling errors, as well as hidden risk of eccentric air gap.

4) The outer gear and the motor rotor of the gerotor are directly equipped with the ball bearing, the end face clearance can be directly controlled.

5) In the disclosure, the outer gear is integrated with the motor rotor, the motor stator and the pump housing have very similar thermal expansion coefficient, which greatly reduces the influence of temperature on the clearance of the oil pump, accurately maintains the end face clearance of the pump, and effectively reduces or avoids the temperature influence on the system flow efficiency.

6) The ball bearing and pump housing are processed with the same mechanical fixture, so that both have very precise coaxiality and concentricity, to accurately control the air-gap eccentricity.

7) The air-gap between the outer diameter of the ball bearing and the inner diameter of the pump housing in the pump are precisely controlled, and based on the ball bearing without bearing bushing, the end face clearance of the pump can be directly controlled, which effectively reduces and eliminates the potential risk of air-gap eccentricity when connecting the ball bearing and the gerotor.

8) In the disclosure, the motor rotor and the outer gear together drive the inner gear to rotate around the shaft bushing to pressurize the cooling oil flowing from the oil inlet, a first portion of the pressurized cooling oil flows to the stator assembly through the pin to cool the stator assembly, which effectively reduces the temperature of the heating elements.

9) The pin of the disclosure is designed to be statically fixed. The shaft bushing is pressed directly on the pin. The inner gear of the pump is driven by the outer gear to rotate, such that the inner gear rotates relative to the shaft bushing. The lubrication between them reduces the friction, so that the gerotor loss is significantly reduced and the rotational stability of the gerotor is effectively improved.

10) Compared with the conventional electric oil pump, in the disclosure, the time for the pressurized cooling oil to flow to the stator assembly is shorter, and a better cooling efficiency is acquired.

11) The highly integrated electric oil pump in the disclosure is an advanced design, a higher degree of integration, a smaller size, a lighter weight, and a better cooling efficiency on thermal management.

DETAILED DESCRIPTION

The following, in conjunction with the accompanying drawings, further illustrates the present invention, but the scope of protection of the present invention is not limited to the aforementioned scope.

Figure 1:
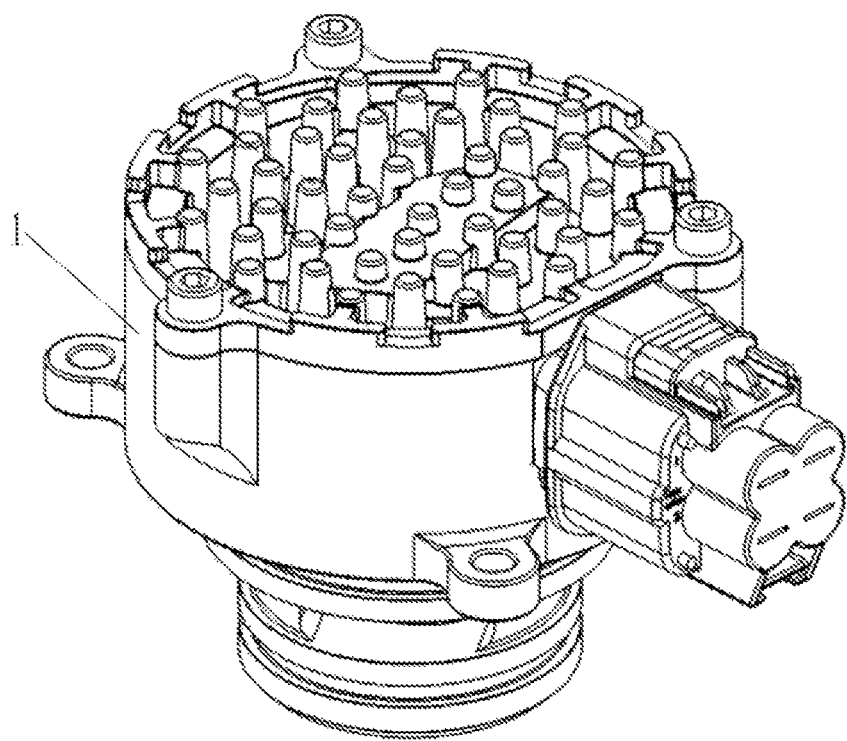
FIG. 1 is a schematic diagram of the overall structure of the highly integrated electric oil pump of the disclosure.

As shown in FIG. 1, a highly integrated electric oil pump includes a pump housing 1. The bottom of the pump housing 1 is provided with an oil inlet 101, and its oil outlet 102 is provided on the side of the pump housing 1. In particular, a filter 14 for filtering the lubricating oil is provided at the oil inlet 101.

In this embodiment, the pump housing 1 is an aluminum housing.

The pump housing 1 is internally equipped with a motor and a gerotor. The gerotor is integrated with the motor rotor. In particular, a ball bearing 7 is arranged between the motor and the gerotor, allowing the ball bearing to be mounted at the end of the gerotor. The motor consists of a stator assembly and a motor rotor 2. The gerotor consists of an inner gear 6, an outer gear 3 and a pin 5.

Figure 2:
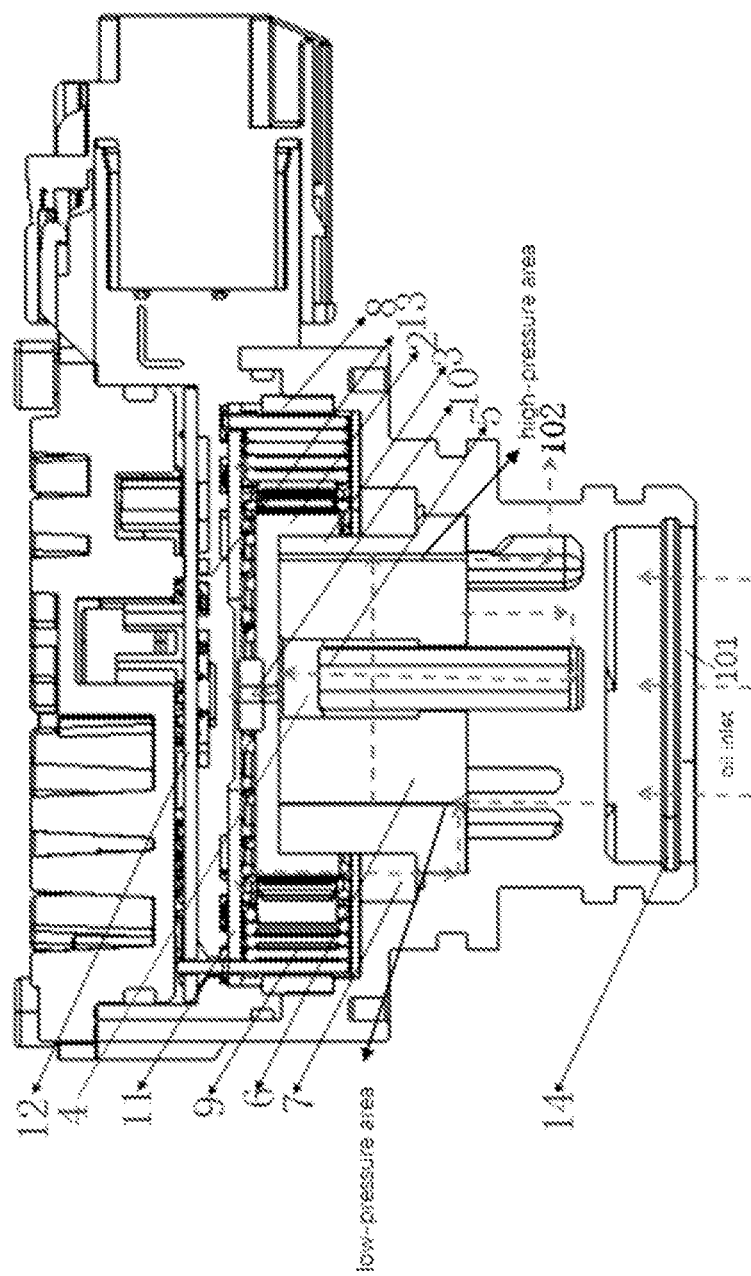
FIG. 2 is a sectional view of the highly integrated electric oil pump of the disclosure.

As shown in FIG. 2, a motor rotor 2 is equipped with the inner side of the stator assembly. An outer gear 3 is mounted in internal part of the motor rotor 2, the outer gear 3 is integrated with the motor rotor 2 and pressed to be together as an entire body. A shaft bushing 4 is mounted at the center of the motor rotor 2. A pin 5 is provided inside the shaft bushing 4, and an inner gear 6 is assembled outside the shaft bushing 4. The inner gear 6 and the pin 5 are respectively in press fit with the shaft bushing 4. In particular, the inner gear 6 is engaged with the outer gear 3.

The outer gear of the disclosure is integrated with the motor rotor 2. On the one hand, the size, weight and material and production costs of the system are significantly reduced. On the other hand, the friction in the pocket of the gerotor is effectively reduced, which has a positive effect on improvement of the system efficiency.

The ball bearing 7 of the disclosure is arranged between the motor rotor 2 and the outer gear 3. The ball bearing 7 supports the motor rotor 2 to ensure the rotation of the outer gear 3 in the gerotor. The ball bearing 7 is mounted at the end of the gerotor, so that no pocket between the motor and the gerotor exists, which reduces the height of the electric oil pump and significantly reduces the weight and size of the gerotor.

Compared with the traditional electric oil pump, in which the motor rotor is pressed into the ball bearing support and then into the ball bearing and the gerotor, no ball bearing support is provided in the disclosure, which reduces the overall height of the electric oil pump on the one hand, so that the flow path of the pressurized cooling oil flowing to the stator assembly is shortened, thereby less time is required and a better cooling efficiency is obtained, and on the other hand, by which assembly stacking errors can be optimized due to less interfaces, resulting in few air-gap eccentricity issue.

The ball bearing 7 and the pump housing 1 in this embodiment are processed with the same mechanical fixture, so that both have very precise coaxiality and concentricity, so as to accurately control the air-gap eccentricity.

In the disclosure, since the outer gear is integrated in the motor rotor, the stator 8 of the motor and the gerotor have the same thermal expansion coefficient, which greatly reduces the influence of temperature on the end face clearance of the oil pump, accurately maintains the end face clearance of the pump, and effectively reduces or avoids the influence of temperature on the system flow efficiency.

The mechanism of the cooling oil for the stator assembly in the present invention is as follows:

The motor rotor 2 and the outer gear 3 jointly drive the inner gear 6 to rotate around the shaft bushing 4, to pressurize the cooling oil flowing in from the oil inlet 101, so that the pressurized cooling oil flows to the stator assembly through the pin 5 to cool the stator assembly, and the cooling oil undergoing heat exchange flows back to a low-pressure zone.

In addition, the other pressurized cooling oil is discharged directly from the oil outlet 102 through the high-pressure zone.

In this embodiment, the pin 5 is internally provided with a passage for the cooling oil to pass through.

In addition, the pin 5 has a hollow structure or a solid structure.

In particular, the pin 5 of the disclosure is designed for static fixation. The shaft bushing 4 is pressed directly onto the pin 5. The inner gear 6 rotates relative to the shaft bushing 4 under the drive of the outer gear 3, which pumps the inner gear 6 to rotate, lubricating each other to reduce friction, thereby reducing the loss of the gerotor, and improving the rotational stability of the gerotor.

Due to the reduction in height of the entire electronic oil pump, compared with a traditional electronic oil pump, in the present invention, the pressurized cooling oil flows to the stator assembly in a shorter time, resulting in better cooling effects.

In this embodiment, the stator assembly includes a stator 8 and a stator winding 9 mounted on the stator 8. In this embodiment, the stator 8 is made of silicon steel sheets to reduce manufacturing costs and friction of rotary components. The wire diameter of the stator winding 9 is 1.8 mm. Compared to the traditional wire diameter of 1.6 mm, the performance of the gerotor is significantly improved.

In this embodiment, radial magnets 10 are mounted on the motor rotor 2 to produce the permanent magnetic force to interact with the electrical magnetic force of the stator.

To simplify the electrical controller configurations and streamline the traditional windings, a hub 11 is provided above the stator assembly. The pins of the stator windings 9 are connecting to the hub 11.

A controller 12 is arranged above the hub 11. The controller 12 of the disclosure is capable of achieving rapid response. It features circuit reverse connection protection, prevention of signal interference, monitoring of oil temperature to prevent prevents overheating, possession of independent communication channels, detection of motor angular position, reception of and calculated motor speed for comparison, and exact adjustment of the actual rotor speed.

In order to separate the oil circuit and the electrical controller section, a thermal insulation sealing plate 13 is provided between the controller 12 and the hub 11, to improve the sealing performance. The thermal insulation sealing plate 13 is fixedly connected and coordinated with the hub 11 to avoid the internal use of screw assembly fixation structure in the oil pump.

A PTC (Positive Temperature Coefficient) temperature sensor (not labeled in figure) for detecting and providing feedback on the cooling oil temperature. The PTC temperature sensor (not labeled in the figure) is electrically connected to the controller 12. The PTC temperature sensor of the disclosure can detect the oil temperature with an accuracy of 0.1° C.

The specific process for cooling the stator assembly in the disclosure is as follows.

(1) First, pump is powered on. At this point, the controller 12 is supplied with the power. The controller 12 converts the power into three-phase electricity to power the stator windings 9 on the hub 11. The electromagnetic force drives the motor rotor 2 and the outer gear 3 to rotate. The rotation of the motor rotor 2 and of the outer gear 3 causes the cooling oil flowing from the oil inlet 101 to enter the low-pressure zone after passing through the filter 14.

(2) The motor rotor 2 and the outer gear 3 jointly drive the inner gear 6 to rotate around the shaft bushing 4, so as to pressurize the cooling oil flowing from the oil inlet 101, so that the pressurized cooling oil flows to the stator assembly through the pin 5 to cool the stator assembly. The cooling oil undergoing heat exchange then flows back to the low-pressure zone. The cooling oil is pressurized by the centrifugal force created by the difference between the inner gear and the outer gear. At this point, the PTC temperature sensor feeds back the current temperature value of the oil and this temperature value is then fed back to the controller 12, and the controller 12 communicates the current oil temperature value to an external controller system.

(3) The other pressurized cooling oil is discharged directly from the oil outlet 102 after passing through the high-pressure zone.

REFERENCE SIGNS

1 Pump Housing
101 Oil Inlet
102 Oil Outlet
2 Motor Rotor
3 outer gear
4 Shaft Sleeve
5 Pin
6 inner gear
7 Ball Bearing
8 Stator
9 Stator Winding
10 Radial Magnet
11 Hub
12 Controller
13 Thermal Insulation Sealing Plate
14 Filter

What is claimed is:

1. An integrated electric oil pump, comprising a pump housing, wherein a motor and a gerotor are provided in the pump housing, the gerotor is installed in the motor, a ball bearing is provided between the motor and the gerotor, the motor comprises a stator assembly and a motor rotor, the gerotor comprises an inner gear, an outer gear and a pin, the motor rotor is hollow and is installed within the stator assembly, the outer gear is provided in the motor rotor, the outer gear is integrated with the motor rotor, a shaft sleeve is installed at a center of the motor rotor, the pin is arranged inside the shaft sleeve, the inner gear is arranged outside the shaft sleeve, the inner gear and the pin are respectively in press fit with the shaft sleeve, and the inner gear is engaged with the outer gear,
   wherein the motor rotor and the outer gear drive the inner gear to rotate around the shaft sleeve, so as to pressurize a cooling oil flowing from an oil inlet of the pump housing to obtain pressurized cooling oil, so that a first portion of the pressurized cooling oil flows to the stator assembly through the pin to cool the stator assembly, and flows back to a first pressure area after heat-exchanging, a second portion of the pressurized cooling oil is discharged directly from an oil outlet of the pump housing after passing through a second pressure area, and the oil outlet of the pump housing is provided at a side of the pump housing,
   wherein a flow channel configured for the cooling oil to pass through is defined in the pin, and
   wherein the ball bearing is arranged between the motor rotor and the outer gear, and the ball bearing is mounted at an end of the gerotor.

2. The integrated electric oil pump according to claim 1, wherein the ball bearing and the pump housing are processed with a same mechanical fixture.

3. The integrated electric oil pump according to claim 1, wherein a stator of the stator assembly of the motor and a pump body of the gerotor have a same thermal expansion coefficient.

* * * * *